United States Patent Office 3,584,004
Patented June 8, 1971

3,584,004
SUBSTITUTED 1,2,5-THIADIAZOLIDINE-1-OXIDES AND METHODS OF PREPARATION
William Blythe Wright, Jr., Woodcliff Lake, N.J., assignor to American Cyanamid Company, Stamford, Conn.
No Drawing. Filed Mar. 20, 1969, Ser. No. 808,982
Int. Cl. C07d 91/14
U.S. Cl. 260—302D
9 Claims

ABSTRACT OF THE DISCLOSURE

The preparation of substituted 1,2,5-thiadiazolidine-1-oxides by cyclizing a substituted ethylenediamine is described. The products resulting are useful for their central nervous system activity.

DESCRIPTION OF THE INVENTION

This invention relates to new organic compounds. More particularly it relates to substituted 1,2,5-thiadiazolidine-1-oxides and methods of preparing the same.

The novel substituted 1,2,5-thiadiazolidine-1-oxides of the present invention can be illustrated by the following formula:

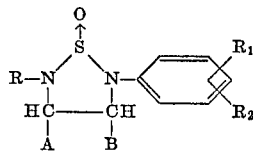

wherein R is lower alkyl; $R_1$ and $R_2$ are selected from the group consisting of hydrogen, halogen, lower alkyl, lower alkoxy and trifluoromethyl; A and B are selected from the group consisting of hydrogen and lower alkyl, at least one of which is lower alkyl.

The compounds of this invention, in general, may be either liquids or solids at room temperature. They are relatively insoluble in water, but may be dissolved in organic solvents such as, for example, lower alkyl alcohols, ether, benzene, acetone, chloroform and the like.

The compounds of this invention may be prepared by the following method which has been found most desirable.

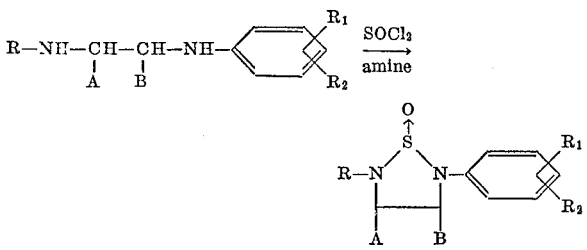

wherein R, $R_1$, $R_2$, A and B are as defined above. In this process, the diamine is treated with thionyl chloride in an inert solvent such as tetrahydrofuran and in the presence of an acid acceptor such as imidazole, pyridine or a tertiary amine. The reaction is preferably carried out at a temperature in the range of −20°–70° C.

The present compounds can also be prepared by an alternative procedure, wherein the diamine to give the desired final products is treated with 1,1′-sulfinyldiimidazole:

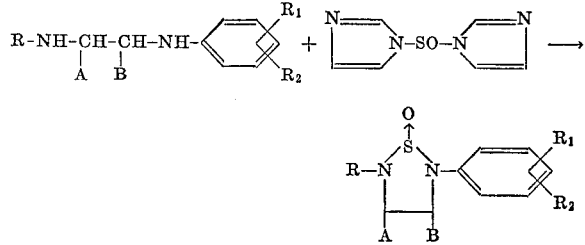

wherein R, $R_1$, $R_2$, A and B are as defined above. This reaction is preferably carried out in an inert solvent such as tetrahydrofuran at a temperature within the range of −20 to 70° C.

The anti-depressant properties of the compounds of the present invention are evident by measuring the ability to counteract in animals a depression induced by the administration of tetrabenazine hexamate. Graded doses of these compounds are administered intraperitoneally to groups of mice. One hour later tetrabenazine hexamate (a well-known agent capable of producing a profound depression) is administered at a dose which is known to depress exploratory behavior in groups of normal mice. The following tests were carried out: Doses of 25 milligrams per kilogram of the test compounds are administered intraperitoneally to 5 mice one hour before the administration of tetrabenazine hexamate at a dose of 30 mg./kg. (intraperitoneal) which is known to depress markedly the exploratory behavior of normal mice. Thirty minutes later the mice are tested for their exploratory behavior. If 4 or more of 15 mice show exploratory behavior then graded doses of the active test compounds are administered to additional groups of 5 mice. The antidepressant treated groups show normal exploratory behavior, while the control groups and groups treated with an ineffective anti-depressant agent, do not show this normal exploratory behavior, but show the well known, profound depression induced by tetrabenazine. The results from several dose levels are used to establish effective dose ranges. This method has been described by Greenblatt, E. N. and Ostenberg, A. C. in Toxicology and applied Pharmacology 7, pp. 566–578, (1965).

The results of the above testing of representative compounds are accurately summarized in Table I as follows:

Table I.—Reversal of tetrabenazine hexamate depression

| Compound: | Range of active doses (mg./kg.) intraperitoneal |
|---|---|
| I. dl 2,4-dimethyl-5-phenyl-1,2,5-thiadiazolidine-1-oxide | 6.2–25 |
| II. dl 2,3-dimethyl-5-phenyl-1,2,5-thiadiazolidine-1-oxide | 3.1–25 |
| III. d 2,3-dimethyl-5-phenyl-1,2,5-thiadiazolidine-1-oxide | 6.2–25 |
| IV. l 2,3-dimethyl-5-phenyl-1,2,5-thiadiazolidine-1-oxide | 6.2–25 |
| V. 2-m-chlorophenyl-3,5-dimethyl-1,2,5-thiadiazolidine-1-oxide | 25 |

These compounds compare favorably with effective antidepressant drugs such as imipramine and amitryptyline when tested by the above techniques.

The 1,2,5-thiadiazolidine-1-oxides may be administered to warm-blooded animals orally, or parenterally if desired, and when so administered, may be considered as an anti-depressant agent for therapeutically desirable treatment of depression in warm-blooded animals. The dosage regimen can be adjusted to provide optimum therapeutic response. Thus, for example, several doses may be administered daily, or the dose may be reduced proportionately as indicated by the requirements of the particular therapeutic situation.

For therapeutic administration the active compounds of this invention may be incorporated with pharmaceutical carriers such as excipients and used, for example, in the form of tablets, dragées, capsules, suppositories, liquids, elixirs, emulsions, suspensions, syrups, chocolate, candy, wafers, chewing gum, or the like. Such compositions and preparations should contain at least 0.1% of active component. The percentage of the compositions and preparations may, of course, be varied, and may conveniently be between 2% and 60% or more of the weight of the unit. The amount of active component in such therapeutically useful compositions or preparations is such that a suitable dosage will be obtained. Preferred compositions or preparations according to the present invention are prepared so that a doseage unit form contains between about 5 and about 300 milligrams of the 1,2,5-thiadiazolidine-1-oxides.

The products of this invention are physiologically active as anti-depressants. As such, they can be incorporated in various pharmaceutical forms such as tablets, capsules, pills, and so forth, for immediate or sustained release, by combining with suitable pharmaceutical carriers. They may be in the form of dosage units for a single therapeutic dose or in small units for multiple dosages or in larger units for division into single doses. Obviously, in addition to the therapeutic anti-depressant compound there may be present excipients, binders, fillers, and other therapeutically inert ingredients necessary in the formulation of the desired pharmaceutical preparation.

The following specific examples illustrate the preparation of representative compounds of the present invention. Parts are by weight unless otherwise indicated.

EXAMPLE 1

Preparation of dl 2,3-dimethyl-5-phenyl-1,2,5-thiadiazolidine-1-oxide

A mixture of 7.63 parts of $N^2$-benzyl-$N^2$-methyl-$N^1$-phenyl-1,2-propanediamine (W. B. Wright, Jr., H. J. Brabander and R. A. Hardy, Jr., J. Org. Chem. 26, 485 (1961)), 6 parts of 5 N hydrochloric acid, 150 parts of ethanol and 2 parts of 1% palladium-on-carbon catalyst is shaken in a Parr hydrogenator under about 45 pounds of hydrogen pressure until hydrogen uptake is complete. The catalyst is filtered off and the filtrate is concentrated to remove the solvent. The residue is shaken with 10 parts of water, 8 parts of 5 N sodium hydroxide and 200 parts of benzene. The layers are separated and the benzene layer is washed with a little water, dried over magnesium sulfate and concentrated. The residual oil is $N^2$-methyl-$N^1$-phenyl-1,2-propanediamine.

A solution of 8.4 parts of imidazole in 80 parts of tetrahydrofuran is cooled and 3.6 parts of thionyl chloride are added. The mixture is stirred for 5 minutes and a solution of 4.9 parts of $N^2$-methyl-$N^1$-phenyl-1,2-propanediamine in 15 parts of benzene is added. The cooling bath is removed and the mixture is stirred at room temperature for 24 hours and then heated on a steam bath for 1 hour. The reaction mixture is concentrated to remove the solvent, shaken with a mixture of 50 parts of water and 150 parts of benzene, and the layers are separated. The benzene layer is washed with water, dried over magnesium sulfate and concentrated. The residue is recrystallized from ether and pure dl 2,3-dimethyl-5-phenyl-1,2,5-thiadiazolidine-1-oxide, melting point 66–68° C. is obtained.

EXAMPLE 2

Preparation of d-2,3-dimethyl-5-phenyl-1,2,5-thiadiazolidine-1-oxide

This compound, melting point 74–76° C. and $\alpha_D^{25}$ +32.8° (2.0% in $CHCl_3$), is obtained when d-$N^2$-benzyl-$N^2$-methyl-$N^1$-phenyl-1,2-propanediamine (W. B. Wright, Jr. and R. A. Hardy, Jr., J. Med. Chem. 6, 128 (1963)) is treated as described in the procedure of Example 1.

EXAMPLE 3

Preparation of l-2,3-dimethyl-5-phenyl-1,2,5-thiadiazolidine-1-oxide

When l-$N^2$-benzyl-$N^2$-methyl-$N^1$-phenyl-1,2-propanediamine (Wright et al., J. Med. Chem. 6, 128 (1963)) is reacted as described in the procedure of Example 1, the the above compound, melting point 75–76° C. and $\alpha_D^{25}$ −32.0 (2.0% in $CHCl_3$), is obtained.

EXAMPLE 4

Preparation of 2,3-dimethyl-5-phenyl-1,2,5-thiadiazolidine-1-oxide

A solution of 5.6 parts of imidazole in 40 parts of tetrahydrofuran is cooled in an ice bath and 2.4 parts of thionyl chloride are added with stirring. The mixture is stirred for 5 minutes longer and then filtered to remove the precipitate. The precipitate is washed with a little tetrahydrofuran. The combined filtrates, a solution of 1,1'-sulfinyldiimidazole, are added immediately with stirring to a solution of 3.28 parts of $N^2$-methyl-$N^1$-phenyl-1,2-propanediamine in 50 parts of tetrahydrofuran. The mixture is left at 25° C. for 20 hours, heated on the steam bath for 2 hours, and concentrated to remove the solvent. The residue is shaken with 150 parts of benzene and 50 parts of water and the layers are separated. The benzene layer is washed with water, dried over magnesium sulfate and concentrated and the residue is recrystallized from ether. The 2,3-dimethyl-5-phenyl-1,2,5-thiadiazolidine-1-oxide melts at 66°–68° C.

EXAMPLE 5

Preparation of 2,3-dimethyl-5-phenyl-1,2,5,-thiadiazolidine-1-oxide

A solution of 3.28 parts of $N^2$-methyl-$N^1$-phenyl-1,2-propanediamine and 4.0 parts of triethylamine in 150 parts of tetrahydrofuran is cooled to −10° C. and 2.4 parts of thionyl chloride are added. The mixture is allowed to stir at room temperature for 20 hours, heated on the steam bath for 2 hours and filtered. The filtrate is concentrated, and the residue is shaken with 50 parts of water and 150 parts of benzene. The layers are separated and the benzene layer is washed with water, dried over magnesium sulfate and concentrated. The residue is recrystallized from ether and 2,3-dimethyl-5-phenyl-1,2,5-thiadiazolidine-1-oxide, melting point 66–68° C., is obtained.

EXAMPLE 6

Preparation of 2,4-dimethyl-5-phenyl-1,2,5-thiadiazolidine-1-oxide

A solution of 24.2 parts by volume of $\alpha$-bromopropionyl bromide in 400 parts of benzene or toluene is cooled and 56 parts of benzylmethylamine are added with stirring. The mixture is stirred at room temperature for 1 hour and 200 parts of water are added. The layers are separated and the oganic layer is washed with water and dried over magnesium sulfate. The organic layer is mixed with 50 parts of aniline, heated at reflux temperature for 24 hours, and treated with 200 parts of water. The layers are separated and the organic layer is washed with water, dred over magnesium sulfate, and concentrated under reduced pressure to remove the solvent and any unreacted aniline. The crude residue, 2-anilino-N-benzyl-N-methyl-propionamide, is used in the next step without further purification.

The above amide in 200 parts of tetrahydrofuran is added with cooling to 20 parts of lithium aluminum hydride in 500 parts of tetrahydrofuran. The mixture is heated at reflux temperature for 20 hours and carefully treated with 140 ml. of 6.5% sodium hydroxide solution. The reaction mixture is filtered and the precipitate is washed with tetrahydrofuran. The mother liquor is concentrated and distilled. $N^1$-benzyl-$N^1$-methyl-$N^2$-phenyl-1,2-propanediamine is collected at 140°–144° C./0.4 mm.

A mixture of 25.4 parts of the above diamine, 20 parts of 5 N hydrochloric acid, 200 parts of ethanol and 2 parts of 10% palladium-on-carbon catalyst is shaken under about 45 pounds of hydrogen pressure on the Parr hydrogenator until reduction is complete. The catalyst is filtered off and the filtrate is concentrated to remove the solvent. Sodium hydroxide solution is added and the $N^1$-methyl-$N^2$-phenyl-1,2-propanediamine is extracted into benzene and distilled.

A solution of 8.4 parts of imidazole in 80 parts of tetrahydrofuran is cooled and 3.6 parts of thionyl chloride is added. The mixture is stirred for 5 minutes and a solution of 4.9 parts of $N^1$-methyl-$N^2$-phenyl-1,2-propanediamine in 15 parts of benzene is added. The cooling bath is removed and the mixture is stirred at room temperature for 24 hours and then heated on the steam bath for 1 hour. The reaction mixture is concentrated to remove the solvent, shaken with a mixture of 50 parts of water and 150 parts of benzene, and the layers are separated. The benzene layer is washed with water, dried over magnesium sulfate and concentrated. The residue is recrystallized from ether and 2,4-dimethyl-5-phenyl-1,2,5-thiadiazolidine-1-oxide, melting point 103°–105° C., is obtained.

EXAMPLE 7

Preparation of 2,3-dimethyl-5-m-tolyl-1,2,5-thiadiazolidine-1-oxide

The above compound, melting point 69°–70° C., is obtained when m-toluidine is substituted for benzylmethylamine and benzylmethylamine is substituted for aniline in the procedure of Example 6.

EXAMPLE 8

Preparation of 2-m-methoxyphenyl-4,5-dimethyl-1,2,5-thiadiazolidine-1-oxide

This compound is obtained as an oil, $N_D^{23}$ 1.569, when m-anisidine is substituted for benzylmethylamine and benzylmethylamine is substituted for aniline in the procedure of Example 6.

EXAMPLE 9

Preparation of 2,3-dimethyl-5-m-trifluoromethylphenyl-1,2,5-thiadiazolidine-1-oxide When m-trifluoromethylaniline is substituted for benzylamine and benzylmethylamine is substituted for aniline in the procedure of Example 6, the above compound, melting point 119°–121° C., is obtained.

EXAMPLE 10

Preparation of 2-ethyl-3-methyl-5-phenyl-1,2,5-thiadiazolidine-1-oxide

The above compound is obtained as an oil, $N_D^{23}$ 1.568, when aniline is substituted for benzylmethylamine and benzylethylamine is substituted for aniline in the procedure of Example 6.

EXAMPLE 11

Preparation of 3-ethyl-2-methyl-5-phenyl-1,2,5-thiadiazolidine-1-oxide

This compound, melting point 40°–41° C., is obtained when aniline is substituted for benzylmethylamine, 2-bromobutyrylbromide is substituted for 2-bromopropionyl bromide and benzylmethylamine is substituted for aniline in the procedure of Example 6.

EXAMPLE 12

Preparation of 2-p-ethylphenyl-4,5-dimethyl-1,2,5-thiadiazolidine-1-oxide

The above compound is obtained when p-ethylaniline is substituted for benzylmethylamine and benzylmethylamine is substituted for aniline in the procedure of Example 6.

EXAMPLE 13

Preparation of 2-m-chlorophenyl-3,5-dimethyl-1,2,5-thiadiazolidine-1-oxide

When m-chloroaniline is substituted for aniline in the procedure of Example 7, $N^1$-benzyl-$N^2$-m-chlorophenyl-$N^1$-methyl-1,2-propanediamine, boiling point 145°–155° C./0.05 mm., is prepared.

A mixture of 35 parts of the above compound, 34 parts of ethyl chloroformate and 250 parts of benzene is heated at reflux temperature for 18 hours, diluted with sodium hydroxide solution and the layers separated. The benzene layer is washed with water, dried over magnesium sulfate and again heated for 18 hours at reflux temperature with 34 parts of ethyl chloroformate. Water is added and the layers are separated. The benzene layer is washed with water, dried over magnesium sulfate and distilled. N-[2-carboxymethylamino)-1-methylethyl] - m-chlorocarbanilic acid diethyl ester, is collected at 145°–150° C./0.05 mm.

A mixture of 22 parts of the above compound, 250 parts of acetic acid and 300 parts of 48% hydrobromic acid is heated at reflux temperature for 24 hours and concentrated to remove the solvent. Benzene, water and sodium hydroxide are added and the benzene layer is washed with water and concentrated. $N^2$-m-chlorophenyl-$N^1$-methyl-1,2-propanediamine crystallizes and is recrystallized from ethyl acetate, melting point 72°–73° C.

When the compound, immediately above, is treated with thionyl chloride by the procedure of Example 5, 2-m-chlorophenyl-3,5-dimethyl - 1,2,5 - thiadiazolidine-1-oxide is obtained as an oil, $N_D^{23}$ 1.583.

EXAMPLE 14

Preparation of 3-ethyl-5-methyl-2-phenyl-1,2,5-thiadiazolidine-1-oxide

When 2-bromobutyrylbromide is substituted for α-bromopropionyl bromide in the procedure of Example 6, the above compound is obtained.

EXAMPLE 15

Preparation of 2-m-chlorophenyl-4,5-dimethyl-1,2,5-thiadiazolidine-1-oxide

When $N^1$-m-chlorophenyl-$N^2$-methyl - 1,2 - propanediamine is reacted with thionyl chloride by the procedure of Example 5, the above compound, melting point 82°–84° C., is obtained.

EXAMPLE 16

Preparation of 2-p-fluorophenyl-4,5-dimethyl-1,2,5-thiadiazolidine-1-oxide

The above compound is obtained when $N^1$-p-fluorophenyl-$N^2$-methyl-1,2-propanediamine is treated with thionyl chloride by the procedure of Example 5.

EXAMPLE 17

Preparation of 2-m-bromophenyl-4,5-dimethyl-1,2,5-thiadiazolidine-1-oxide

When $N^1$-m-bromophenyl-$N^2$-methyl - 1,2 - propanediamine is reacted with thionyl chloride by the procedure of Example 5, the above compound is obtained.

EXAMPLE 18

Preparation of 2-(2-chloro-5-trifluoromethylphenyl)-4,5-dimethyl-1,2,5-thiadiazolidine-1-oxide The above compound, melting point 78°–80° C., is obtained when $N^1$-(2-chloro-5-trifluoromethylphenyl)-$N^2$-methyl-1,2-propanediamine is treated with thionyl chloride by the procedure of Example 5.

EXAMPLE 19

Preparation of 2-(3-methoxy-5-methylphenyl)-4,5-dimethyl-1,2,5-thiadiazolidine-1-oxide When $N^1$-(3-methoxy-5-methylphenyl) - $N^2$ - methyl-1,2,5-thiadiazolidine-1-oxide is treated with thionyl chloride by the procedure of Example 5, the above compound is obtained.

EXAMPLE 20

Preparation of 2-(3,4-dichlorophenyl)-4,5-dimethyl-1,2,5-thiadiazolidine-1-oxide The above compound is obtained when $N^1$-(3,4-dichlorophenyl)-$N^2$-methyl-1,2-propanediamine is tretted with thionyl chloride as described in Example 5.

EXAMPLE 21

Preparation of 2-(3-bromo-5-methylphenyl)-4,5-dimethyl-1,2,5-thiadiazolidine-1-oxide When $N^1$-(3-bromo-5-methylphenyl)-$N^2$-methyl - 1,2-propanediamine is treated with thionyl chloride by the procedure of Example 5, the above compound is obtained.

What is claimed is:

1. A 1,2,5-thiadiazolidine-1-oxide of the formula:

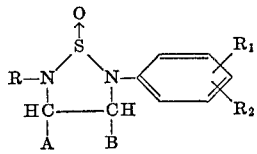

wherein R is lower alkyl; $R_1$ and $R_2$ are selected from the group consisting of hydrogen, halogen, lower alkyl, lower alkoxy and trifluoromethyl; A and B are selected from the group consisting of hydrogen and lower alkyl, at least one of which is lower alkyl.

2. A thiadiazolidine according to claim 1: 2,3-di-lower-alkyl-5-phenyl-1,2,5-thiadiazoline-1-oxide.

3. The thiadiazolidine according to claim 1: 2,4-dimethyl-5-phenyl-1,2,5-thiadiazolidine-1-oxide.

4. The thiadiazolidine according to claim 1: 2,3-dimethyl-5-phenyl-1,2,5-thiadiazolidine-1-oxide.

5. The thiadiazolidine according to claim 1: $d$ 2,3-dimethyl-5-phenyl-1,2,5-thiadiazolidine-1-oxide.

6. The thiadiazolidine according to claim 1: $l$ 2,3-dimethyl-5-phenyl-1,2,5-thiadiazolidine-1-oxide.

7. The thiadiazolidine according to claim 1: 2-m-chlorophenyl-3,5-dimethyl-1,2,5-thiadiazolidine-1-oxide.

8. The thiadiazolidine according to claim 1: 2-m-chlorophenyl-4,5-dimethyl-1,2,5-thiadiazolidine-1-oxide.

9. The thiadiazolidine according to claim 1: 2,3-dimethyl-5-m-trifluoromethylphenyl - 1,2,5 - thiadiazolidine-1-oxide.

References Cited

Katritzky et al. (eds.), Advances in Heterocyclic Chemistry, vol. 9, Academic Press, New York, 1968, p. 126.

ALEX MAZEL, Primary Examiner

R. J. GALLAGHER, Assistant Examiner

U.S. Cl. X.R.

260—574, 577; 424—270